United States Patent [19]

Trieschmann et al.

[11] 3,773,688
[45] Nov. 20, 1973

[54] CATALYST SYSTEM FOR THE POLYMERIZATION OF OLEFINS

[75] Inventors: Hans-Georg Trieschmann, Hambach; Friedrich Urban, Limburgerhof; Guenther Schweier; Josef Kohnle, both of Ludwigshafen, all of Germany

[73] Assignee: Badische Anilin- & Soda-Fabrik Aktiengesellschaft, Ludwigshafen/Rhine, Germany

[22] Filed: June 16, 1971

[21] Appl. No.: 153,832

[52] U.S. Cl. ................. 252/429 C, 260/94.9 D
[51] Int. Cl. .............................................. C08f 1/40
[58] Field of Search ............ 252/429 A, 429 C, 252/428

[56] References Cited
UNITED STATES PATENTS

| | | |
|---|---|---|
| 2,989,516 | 6/1961 | Schneider ................. 252/429 C X |
| 3,008,943 | 11/1961 | Guyer ....................... 252/429 C X |
| 3,168,484 | 2/1965 | Engel et al. ................ 252/429 A |
| 3,216,982 | 11/1965 | Orzechowski et al. ..... 252/429 A X |
| 3,288,720 | 11/1966 | Moretti et al. ............. 252/429 A |
| 3,535,299 | 10/1970 | Dassesse et al. ........... 252/429 C X |
| 3,594,330 | 7/1971 | Delbouille et al. ......... 252/429 A |

*Primary Examiner*—Patrick P. Garvin
*Attorney*—Johnston, Root, O'Keefe, Keil, Thompson & Shurtleff

[57] ABSTRACT

Catalyst system for the polymerization of olefins consisting of (1) a powdered inorganic carrier and, applied thereto, (2) an active composition consisting of (2.1) a titanium, zirconium or vanadium compound and (2.2) an aluminum, magnesium or zinc compound. The characterizing feature is that the carrier (1) has been obtained by heating a substance of the general formula

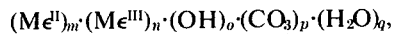

in which $Me^{II}$ denotes a metal or transition metal present in a divalent form; $Me^{III}$ denotes a metal or transition metal present in a trivalent form; m is one of the integers 1 to 10; n is one of the integers 2 to 5; o is one of the integers 2 to 24; p is one of the integers 1 to 3; and q is one of the integers 0 to 10; provided that $2xm + 3xn = o + 2xp =$ an integer from 8 to 26 inclusive.

1 Claim, No Drawings

CATALYST SYSTEM FOR THE POLYMERIZATION OF OLEFINS

The present invention relates to a catalyst system for the polymerization of olefins, consisting of (1) a powdered inorganic carrier having a particle diameter of from 0.1 to 2,000 μ and containing chemically combined metals, and (2) a Ziegler-type catalyst applied to said carrier and consisting of (2.1) a component selected from the group consisting of chlorides, oxychlorides and alkoxy-chlorides of titanium, zirconium and vanadium, and (2.2) a component selected from the group consisting of saturated metal alkyls, saturated metal alkoxyalkyls and saturated metal alkyl halides of the metals aluminum, magnesium and zinc, provided that the ratio of carrier (1) is catalyst component (2.1) — based on the transition metal — is in the range 100:0.1 to 100:10 and that the ratio of the transition metal in catalyst component (2.1) to the metal in catalyst component (2.2) is in tbe range 100:1 to 100:10,000.

It is known that catalyst systems of this kind have certain advantages over comparable catalyst systems of other kinds; but disadvantages are (a) that the catalyst systems are not efficient to the desired extent, i.e., they are not capable of providing the desired quantity of olefin polymer per unit weight of catalyst system, and (b) that the catalyst systems do not permit satisfactory control of the molecular weight of the olefin polymers by using hydrogen during polymerization.

It is an object of the invention to provide a catalyst system of the type defined above, which suffers from the aforementioned disadvantages either not at all or to a greatly reduced extent.

We have found that the above object is achieved if the catalyst system is based on a specific novel carrier.

The present invention thus relates to a catalyst system for the polymerization of olefins consisting of (1) a powdered inorganic carrier having a particle diameter of from 0.1 to 2,000 μ and preferably from 0.1 to 1,000 μ and containing chemically combined metals and (2) a Ziegler-type catalyst applied to said carrier and consisting of (2.1) a catalyst component selected from the group consisting of chlorides, oxychlorides and alkoxychlorides (in particular $C_1$ to $C_{12}$ alkoxychlorides) of titanium, zirconium and vanadium, and (2.2) a catalyst component selected from the group consisting of saturated metal alkyls (in particular metal $C_1$ to $C_{12}$ alkyls), saturated metal alkoxyalkyls (in particular metal $C_1$ to $C_{12}$ alkoxy $C_1$ to $C_{12}$ alkyls) and saturated metal alkylhalides (in particular metal $C_1$ to $C_{12}$ alkylhalides) of the metals aluminum, magnesium and zinc, provided that the weight ratio of carrier (1) to catalyst component (2.1.), based on the transition metal, is in the range 100:0.1 to 100:10, preferably 100:0.3 to 100:5, and that the atomic ratio of the transition metal in catalyst component (2.1) to the metal in catalyst component (2.2) is in the range 100:1 to 100:10,000, preferably 100:10 to 100:6,000. The catalyst system of the invention is characterized in that the carrier has been obtained by heating a substance of the general formula:

for from 1 to 100 hours and preferably from 2 to 50 hours at a temperature of from 150° to 600° C and preferably from 250° to 400° C, in which formula $Me^{II}$ stands for a metal or transition metal present in a divalent form;
$Me^{III}$ stands for a metal or transition metal present in a trivalent form;
m is one of the integers 1 to 10 and preferably one of the integers 2 to 8 and more preferably 6;
n is one of the integers 2 to 5 and preferably one of the integers 2 to 4 and more preferably 2;
o is one of the integers 2 to 24 and preferably one of the integers 8 to 18 and more preferably 16;
p is one of the integers 1 to 3 and preferably 1 or 2 and more preferably 1;
q is one of the integers 0 to 10 and preferably one of the integers 2 to 6 and more preferably 4;
provided that the following relationship holds: $2 \times m + 3 \times n = o + 2 \times p =$ an integer of from 8 to 26, preferably from 16 to 26 and more preferably 18.

This catalyst system not only enables a desirably large quantity of olefin polymer to be produced per unit weight of catalyst system but also permits adequate control of the molecular weight of the olefin polymers by the use of hydrogen during the polymerization process.

The following details may be given regarding the substances contained in the catalyst system of the invention:

(1) the carrier (1) is obtained by heating a compound of the specified general formula for the specified period at the specified temperature. This may be effected, for example, simply be heating the particular compound in an oven in tbe manner commonly used for drying inorganic compounds containing water of crystallization. The desired particle size may be obtained in a simple manner, for example by milling.

In the said compound, suitable metals or transition metals ($Me^{II}$) present in a divalent form are, for example, beryllium, magnesium, calcium, strontium, barium, manganese, iron, cobalt, nickel, palladium, platinum, copper, zinc, cadmium and mercury. Of these, particularly suitable metals are magnesium, manganese, cobalt, nickel, copper, zinc and cadmium; particularly preferred metals being magnesium, manganese, cobalt, nickel, copper and zinc. The metals or transition metals ($Me^{II}$) may be present as single metals or as mixtures of two or more metals.

Suitable metals or transition metals ($Me^{III}$) present in a trivalent form are, for example, chromium, molybdenum, tungsten, iron, ruthenium, osmium, rhenium, iridium, aluminum and gallium. Of these, chromium, molybdenum, tungsten, iron and aluminum are particularly suitable, chromium and aluminum being preferred. The metals or transition metals ($Me^{III}$) may be present as single metals or as mixtures of two or more metals.

The compounds of the specified general formula are readily obtainable. One successful method of producing them is as follows: the selected metals or transition metals are used in tbe form of their water-soluble salts, such as chlorides, sulfates or, preferably, nitrates, and are dissolved together in water in a ratio which corresponds to the desired composition of the compound and stoichiometrically obeys the specified general formula. The resulting salt solution should contain a total of about 0.5 to 5 percent and preferably from 1.0 to 4 percent molar of metal ions or transition metal ions. It is heated to a temperature of from 50° to 100° C and preferably from 60° to 90° C and then combined, over from 0.5 to 120 minutes and preferably from 1 to 60 minutes, with an equivalent amount or, preferably, a slight excess of a 1–5 percent and preferably 1.5–4 percent molar aqueous solution of an alkali bicarbonate, in particular sodium bicarbonate, which has been heated at from 50° to 100° C and preferably from 60 to 90° C. We prefer to use an excess of alkali bicarbonate, this being up to 20 percent and preferably from 0.5 to 3 percent by weight, over the theoretical amount of bicarbonate. On completion of the addition of alkali bicarbonate solution, the mixture is conveniently stirred for about from 10 to 30 minutes and preferably from 15 to 20 minutes before the resulting precipitate is filtered off, washed with water and freed from excess water by suction. In this manner, the compounds of the type under consideration are obtained in approximately quantitative yields. The manufacture of these compounds does not form part of the present invention.

(2) The active portion (2) of the catalyst and the catalyst components (2.1) and (2.2) are known and may be referred to as those commonly used in the art.

(2.1) Suitable catalyst components of this type are, for example, $TiCl_4$, $ZrCl_4$, $VCl_4$, $VOCl_3$, $TiCl_3(OC_4H_9)$ and $TiCl_2(OC_2H_5)_2$. Of these, $TiCl_4$, $VCl_4$ and $VOCl_3$ are particularly suitable, $TiCl_4$ being especially preferred. The catalyst components (2.1) may be present as individual components or as mixtures of two or more components.

(2.2) Suitable catalyst components of this type are, for example, $Mg(C_4H_9)_2$, $Al(C_2H_5)_3$, $Al(C_3H_7)_3$, $Al(C_4H_9)_3$, $Al(C_8H_{17})_3$, $Al(C_{12}H_{25})_3$, $Al(C_2H_5)_2Cl$, $Al(C_2H_5)_2(OC_2H_5)$ and $Zn(C_2H_5)_2$. Of these $Al(C_2H_5)_3$, $Al(C_3H_7)_3$, $Al(C_4H_9)_3$, $Al(C_8H_{17})_3$, $Al(C_{12}H_{25})_3$, $Al(C_2H_5)_2Cl$ and $Zn(C_2H_5)_2$ are particularly suitable, the aluminum compounds being preferred. The catalyst components (2.2) may be present as individual components or as mixtures of two or more components.

Application of the catalyst (2) to the carrier (1) may be carried out in conventional manner. For example, one method is to contact the carrier with the active component (2.1) and subsequently with the active component (2.2). More specifically, for example, the carrier may be conveniently left for several hours in boiling catalyst component (2.1) or a boiling solution of said catalyst component, under atmospheric conditions, and then thoroughly washed with an inert solvent and dried, for example in a vacuum. The resulting preliminary form of the catalyst system may be very readily converted to the active form by combining it with catalyst component (2.2), which may be present, for example, in a solution. This may take place in the vessel used for polymerization or in a separate vessel. Alternatively, the catalyst component (2.2) may be applied to the carrier (1), followed by the catalyst component (2.1). A further possibility, for special cases, is to apply catalyst components (2.1) and (2.2) to the carrier simultaneously.

The catalyst system of the invention is particularly suitable for use in the polymerization of $C_2$ to $C_8$ olefins, for example ethylene, propylene, butene, hexene and butadiene. Mixtures of olefins may also be polymerized with the aid of the present system. The system is particularly suitable for the polymerization of ethylene and propylene, and its beneficial properties are best revealed in the polymerization of ethylene.

The present invention does not relate to any particular process for the polymerization of olefins with the aid of the catalyst system of the invention. The polymerization of olefins using this system may be carried out in any conventional manner.

In the following Examples, the application of the catalyst (2) or its components (2.1) and (2.2) to the carrier is carried out, as usual, under a blanket of inert gas (in this case nitrogen).

EXAMPLE 1

300 g of a material of the formula:

$$(Mg^{II})_6 \cdot (Cr^{III})_2 \cdot (OH)_{16} \cdot (CO_3)_1 \cdot (H_2O)_4$$

are placed in a drying oven and spread over an area of 400 cm² and held at a temperature of 320° C for 20 hours. This produces a carrier (1) which is then ground to a particle size of from about 5 to 100 μ.

A conventional extraction apparatus is taken, this being equipped with a bulb, an extraction chamber fitted with a glass frit and disposed above the bulb, a stirrer located within the extraction chamber and a reflux condenser fitted above the extraction chamber. 200 g of the carrier are charged to the extraction chamber and 1.5 l of $TiCl_4$ are placed in the bulb. The $TiCl_4$ is then heated to the boil and held at the boil for a further 7 hours, during which period, therefore, the carrier is contacted by $TiCl_4$ vapor. The $TiCl_4$-laden carrier is then washed with n-heptane and dried in vacuo at ambient temperature. There is thus produced a catalyst intermediate in which the ratio of carrier to $TiCl_4$ by weight, based on Ti, is about 100:1 100 g of this intermediate are placed in a solution of 23 g of $Al(C_2H_5)_3$ in 100 ml of n-heptane and stirred therein for 1 hour. The solvent is removed at ambient temperature in vacuo. In the resulting catalyst system, the atomic ratio of Ti to Al is about 100:1,000. Using this system, olefins and in particular ethylene may be polymerized with very good results.

EXAMPLES 2 TO 15

Each Example is a repetition of Example 1 except for the modifications shown in the Table below. The first column of the Table gives the number of the Example, the second column gives the formula of the starting material used for the carrier, the third column (t) gives the time in hours during which the said starting material is heated, and the fourth column (T) gives the temperature at which the starting material is heated in °C.

| Ex. | Formula | t | T |
|---|---|---|---|
| 2 | $(Ni^{II})_6 \cdot (Al^{III})_2 \cdot (OH)_{16} \cdot (CO_3)_1 \cdot (H_2O)_4$ | 15 | 290 |
| 3 | $(Mg^{II})_3 \cdot (Zn^{II})_3 \cdot (Al^{III})_2 \cdot (OH)_{16} \cdot (CO_3)_1 \cdot (H_2O)_4$ | 10 | 250 |
| 4 | $(Mg^{II})_6 \cdot (Al^{III})_2 \cdot (OH)_{16} \cdot (CO_3)_1 \cdot (H_2O)_4$ | 30 | 330 |
| 5 | $(Mg^{II})_5 \cdot (Cu^{II})_1 \cdot (Al^{III})_2 \cdot (OH)_{16} \cdot (CO_3)_1 \cdot (H_2O)_4$ | 20 | 300 |
| 6 | $(Mg^{II})_5 \cdot (Mn^{II})_1 \cdot (Al^{III})_2 \cdot (OH)_{16} \cdot (CO_3)_1 \cdot (H_2O)_4$ | 5 | 200 |
| 7 | $(Mg^{II})_2 \cdot (Co^{II})_2 \cdot (Mn^{II})_1 \cdot (Cu^{II})_1 \cdot (Al^{III})_2 \cdot (OH)_{16} \cdot (CO_3)_1 \cdot (H_2O)_4$ | 10 | 230 |
| 8 | $(Mg^{II})_6 \cdot (Cr^{III})_2 \cdot (OH)_{16} \cdot (CO_3)_1 \cdot (H_2O)_4$ | 40 | 310 |
| 9 | $(Mg^{II})_6 \cdot (Fe^{III})_2 \cdot (OH)_{16} \cdot (CO_3)_1 \cdot (H_2O)_4$ | 8 | 210 |
| 10 | $(Co^{II})_6 \cdot (Al^{III})_2 \cdot (OH)_{16} \cdot (CO_3)_1 \cdot (H_2O)_4$ | 15 | 290 |
| 11 | $(Mg^{II})_6 \cdot (Al^{III})_{1.8} \cdot (Cr^{III})_{0.2} \cdot (OH)_{16} \cdot (CO_3)_1 \cdot (H_2O)_4$ | 40 | 320 |
| 12 | $(Mg^{II})_7 \cdot (Al^{III})_3 \cdot (OH)_{21} \cdot (CO_3)_1 \cdot (H_2O)_2$ | 3 | 450 |
| 13 | $(Mg^{II})_{10} \cdot (Fe^{III})_2 \cdot (OH)_{24} \cdot (CO_3)_1 \cdot (H_2O)_2$ | 15 | 300 |
| 14 | $(Be^{II})_1 \cdot (Mo^{III})_5 \cdot (OH)_{13} \cdot (CO_3)_2$ | 30 | 190 |
| 15 | $(Ca^{II})_1 \cdot (W^{III})_2 \cdot (OH)_6 \cdot (CO_3)_1 \cdot (H_2O)_{10}$ | 12 | 250 |

The resulting catalyst systems are very suitable for use in the polymerization of olefins, particularly ethylene and propylene. The ratio by weight of carrier to TiCl$_4$, based on Ti, and the atomic ratio of Ti to Al are, in each case, within the specified limits.

EXAMPLE 16

500 g of a material of the formula $(Mg^{II})_5 \cdot (Co^{II})_1 \cdot (Al^{III})_2 \cdot (OH)_{16} \cdot (CO_3)_1 \cdot (H_2O)_4$ are placed in a drying oven, spread over an area of 600 cm$^2$ and heated at a temperature of 320° C for 24 hours. There is thus obtained a carrier (1) which is ground to a particle size of from about 10 to 200 μ.

300 g of this carrier are immersed in 1 l of VOCl$_3$ for 2 hours at a temperature of about 130° C (i.e., under reflux conditions), and the excess VOCl$_3$ is then decanted. This operation is repeated 3 times, each time with fresh VOCl$_3$, and the product is then washed with n-hexane and dried in vacuo. There is thus obtained a catalyst intermediate in which the ratio of carrier to VOCl$_3$, based on V, is 100:4.1 by weight. 100 g of this intermediate are placed in a solution of 68.4 g of Al(C$_4$H$_9$)$_3$ in 100 ml of n-heptane and stirred therein for 1 hour. The solvent is then removed in vacuo at ambient temperature. In the resulting catalyst system, the atomic ratio of V to Al is about 100:500. Using this system, olefins and in particular ethylene may be polymerized with very good results.

We claim:

1. A catalyst system for the polymerization of ethylene consisting of (1) a powdered inorganic carrier having a particle diameter of from 0.1 to 2,000 μ and containing chemically combined metals and (2) a Ziegler-type catalyst applied to said carrier and consisting of (2.1) titanium tetra-chloride, and (2.2) a saturated aluminum alkyl, the alkyl group having 1 to 12 carbon atoms, provided that the ratio of carrier (1) to catalyst component (2.1), based on the titanium, is in the range 100:1 to 100:10 by weight, and the atomic ratio of the titanium in the catalyst component (2.1) to the aluminum in the catalyst component (2.2) is in the range 100:1 to 100:10,000 wherein the carrier (1) is one which has been obtained by heating a substance of the formula:

$(Mg^{II})_6 \cdot (Al^{III})_2 \cdot (OH)_{16} \cdot (CO_3)_1 \cdot (H_2O)_4$;
$(Mg^{II})_5 \cdot (Cu^{II})_1 \cdot (Al^{III})_2 \cdot (OH)_{16} \cdot (CO_3)_1 \cdot (H_2O)_4$;
$(Mg^{II})_5 \cdot (Mn^{II})_1 \cdot (Al^{III})_2 \cdot (OH)_{16} \cdot (CO_3)_1 \cdot (H_2O)_4$; or
$(Mg^{II})_5 \cdot (Co^{II})_1 \cdot (Al^{III})_2 \cdot (OH)_{16} \cdot (CO_3)_1 \cdot (H_2O)_4$ for from 1 to 100 hours at a temperature of from 150° to 600° C.

* * * * *

UNITED STATES PATENT OFFICE
CERTIFICATE OF CORRECTION

Patent No. 3,773,688  Dated November 20, 1973

Inventor(s) Hans-Georg Trieschmann et al

It is certified that error appears in the above-identified patent and that said Letters Patent are hereby corrected as shown below:

First page, left-hand column, thirteenth line, insert
-- [30]  Foreign Application Priority Data
    June 27, 1970    Germany . . . . . P 20 31 924.8 --.

First page, right-hand column, twenty-fifth line, "2xm + 3xn" should read -- 2xn + 3xm --.

Column 1, line 19, "tbe" should read -- the --.

Column 2, line 30, "be" should read -- by --

Column 2, line 31, "tbe" should read -- the --.

Column 2, line 58, "tbe" should read -- the --.

Column 3, line 60, "tbe" should read -- the --.

Column 3, line 63, "tbe" should read -- the --.

Column 4, line 29, "witb" should read -- with --.

Column 4, line 32, insert -- . -- after "100:1"

Column 6, line 15, insert -- , -- after "100:10,000"

Signed and sealed this 31st day of December 1974.

(SEAL)
Attest:

McCOY M. GIBSON JR.  C. MARSHALL DANN
Attesting Officer    Commissioner of Patents